US010752128B1

(12) United States Patent
Langton et al.

(10) Patent No.: US 10,752,128 B1
(45) Date of Patent: Aug. 25, 2020

(54) SYSTEMS AND METHOD FOR EV BATTERY SECOND-LIFE MANAGEMENT

(71) Applicant: Bayerische Motoren Werke Aktiengesellschaft, Munich (DE)

(72) Inventors: Adam Langton, Mountain View, CA (US); Isaac Lund, Salinas, CA (US); Sean Batir, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/455,476

(22) Filed: Jun. 27, 2019

(51) Int. Cl.
*B60L 58/16* (2019.01)
*H02J 7/14* (2006.01)
*B60L 55/00* (2019.01)

(52) U.S. Cl.
CPC .............. *B60L 58/16* (2019.02); *B60L 55/00* (2019.02); *H02J 7/14* (2013.01)

(58) Field of Classification Search
CPC .............. B60L 58/16; B60L 55/00; H02J 7/14
See application file for complete search history.

(56) References Cited

U.S. PATENT DOCUMENTS

| 7,747,739 | B2* | 6/2010 | Bridges ............ | B60L 3/12 709/224 |
| 8,984,711 | B2* | 3/2015 | Ota ................. | H01M 2/34 15/339 |
| 9,871,370 | B2* | 1/2018 | Friedman ........... | H02H 3/087 |
| 10,541,543 | B2* | 1/2020 | Eaves ............... | B60L 53/31 |
| 2011/0181128 | A1* | 7/2011 | Perreault .......... | H02M 7/797 307/151 |
| 2011/0245987 | A1* | 10/2011 | Pratt ............... | H01M 10/44 700/295 |
| 2012/0133337 | A1* | 5/2012 | Rombouts .......... | B60L 53/63 320/155 |

* cited by examiner

*Primary Examiner* — John D Walters
*Assistant Examiner* — James J Triggs
(74) *Attorney, Agent, or Firm* — Crowell & Moring LLP

(57) ABSTRACT

A system for managing second-lives of a plurality of electric vehicle (EV) batteries includes a plurality of electric vehicles and a stationary second-life unit. Each electric vehicle includes at least one of the plurality of EV batteries during a first-life of each respective EV battery, in which each respective EV battery is utilized to power a respective one of the plurality of electric vehicles. Each of the plurality of electric vehicles is configured for bi-directional electric power exchange with a power grid via a vehicle-to-grid interface. The stationary second-life unit includes each of the plurality of EV batteries during a second-life of each respective EV battery. The stationary second-life unit is configured for bi-directional power exchange with the power grid. A state-of-health of each of the plurality of EV batteries is individually controlled, during the first-life of each respective EV battery, such that the plurality of EV batteries each have substantially similar states-of-health at a start of the second-life of each respective EV battery.

15 Claims, 6 Drawing Sheets

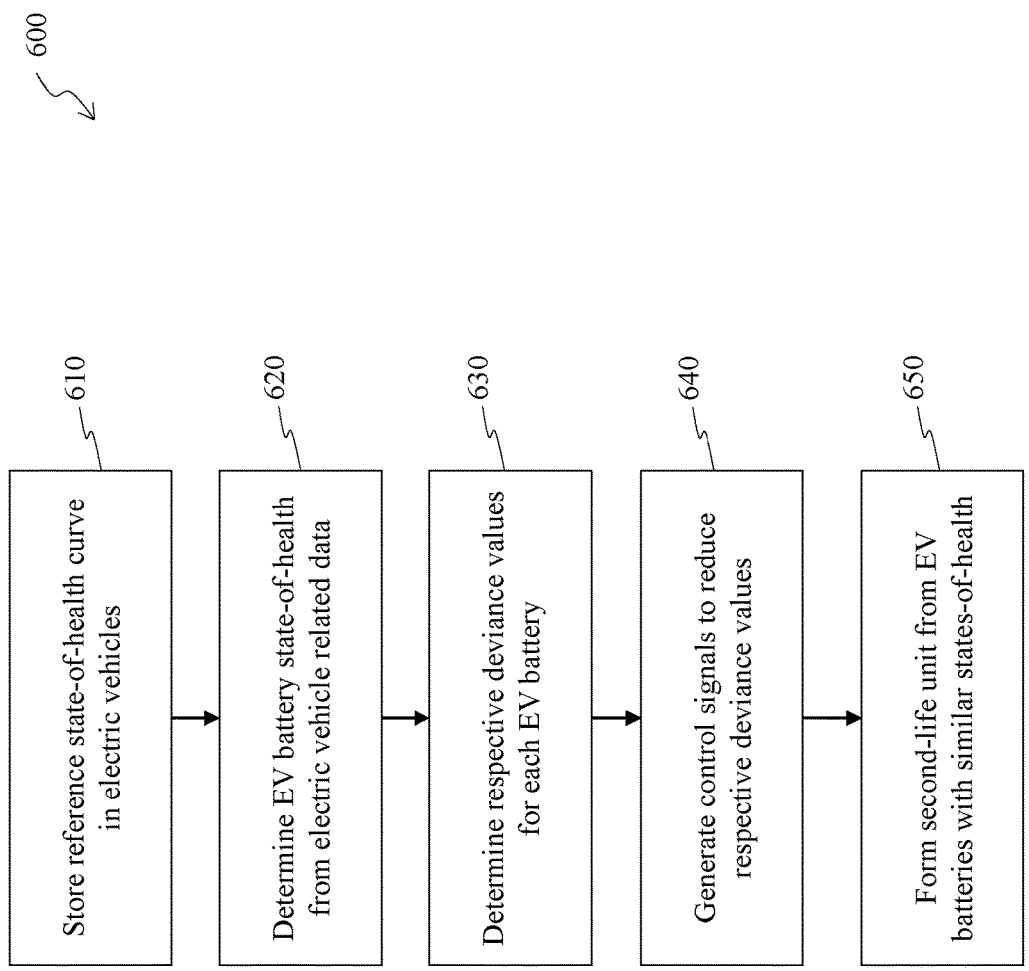

SYSTEMS AND METHOD FOR EV BATTERY SECOND-LIFE MANAGEMENT

FIELD OF THE INVENTION

The present invention relates generally to second-life systems and methods which manage the states-of-health of a plurality of EV batteries for respective second-life uses.

BACKGROUND OF THE INVENTION

Electric vehicle (EV) batteries have limited life spans, which are significantly impacted by their operating conditions, including operating temperatures, partial cycles, charging and discharging rates and profiles, etc. Over time and with use EV batteries become no longer able to meet EV performance standards, such as the ability to adequately hold a charge or supply a desired current.

The ability of any particular EV battery to meet given performance standards is sometimes called the state-of-health of that EV battery. The state-of-health of an EV battery is a function of variables related to its design, its manufacture, its history of use, the environmental conditions in which it is used and stored, the charge-discharge rates, profiles and cycles it has experienced, and other factors. Typically, the performance standards for EV batteries to be used in electric vehicles include maintaining 80 percent of total usable capacity and achieving a resting self-discharge rate of only about 5 percent over a 24-hour period. When EV batteries can no longer meet performance standards, they are typically replaced.

EV batteries can, however, have a second-life, as they are still able to perform sufficiently to serve less-demanding applications, such as stationary energy-storage services and other applications that require less-frequent battery cycling. Some EV battery second-life applications include, for example, providing reserve energy capacity to maintain a utility's power reliability at lower cost by displacing more expensive and less efficient assets (for instance, old combined-cycle gas turbines), deferring transmission and distribution investments, and taking advantage of power-arbitrage opportunities by storing renewable power for use during periods of scarcity, thus providing greater grid flexibility and firming to the grid.

Such second-life uses may encounter problems when a plurality of second-life EV batteries having different states-of-health are grouped together to provide stationary storage capacity in these second-life applications. Where the states-of-health of grouped together second-life EV batteries are substantially different, such differences can impact how they perform when connected to the grid. For example, their performance may be inefficient.

Electric vehicle battery second-life system systems and methods are therefore needed for managing the states-of-health of a plurality of EV batteries for respective second-life uses.

SUMMARY OF THE INVENTION

Disclosed and claimed herein are electric vehicle battery second-life system systems and methods are therefore needed for managing the states-of-health of a plurality of EV batteries for respective second-life uses.

An exemplary system for managing second-lives of a plurality of electric vehicle (EV) batteries includes a plurality of electric vehicles and a stationary second-life unit. Each electric vehicle includes at least one of the plurality of EV batteries during a first-life of each respective EV battery, in which each respective EV battery is utilized to power a respective one of the plurality of electric vehicles. Each of the plurality of electric vehicles is configured for bi-directional electric power exchange with a power grid via a vehicle-to-grid interface. The stationary second-life unit includes each of the plurality of EV batteries during a second-life of each respective EV battery. The stationary second-life unit is configured for bi-directional power exchange with the power grid. A state-of-health of each of the plurality of EV batteries is individually controlled, during the first-life of each respective EV battery, such that the plurality of EV batteries each have substantially similar states-of-health at a start of the second-life of each respective EV battery.

An exemplary method for managing a plurality of electric vehicle (EV) batteries, wherein each of the plurality of EV batteries is utilized to power a respective vehicle-to-grid (V2G) electric vehicle of a plurality of V2G electric vehicles during a first-life of each respective EV battery, includes the step of determining a respective state-of-health of each of the plurality of EV batteries, during the first-life of each respective EV battery. The exemplary method also includes the step of: determining a respective deviance value for the respective state-of-health of each of the plurality of EV batteries, during the first-life of each respective EV battery. The respective deviance value reflects an amount by which the respective state-of-health deviates from a reference state-of-health. The exemplary method also includes the step of: controlling vehicle-to-grid operations of each of the plurality of V2G electric vehicles so as to reduce the respective deviance value of each respective EV battery such that the plurality of EV batteries each have respective state-of-health that are substantially the same. The exemplary method also includes the step of: removing each of the plurality of EV batteries from respective V2G electric vehicles so as to form therewith a stationary second-life unit. The stationary second-life unit includes each of the plurality of EV batteries. The stationary second-life unit is configured for bi-directional power exchange with a power grid.

In accordance with at least these disclosed principles, the state-of-health of each EV battery within the plurality of electric vehicles is provided with a control feedback loop for maintaining the state-of-health of the EV battery at or near the reference state-of-health over the lifespan of the EV battery. In this manner, the states-of-health of the plurality of EV batteries, at least by their ending points, may be managed to be substantially the same.

Accordingly, several advantages of the present invention may be realized. For example, participation in vehicle-to-grid and second-life programs by electric vehicles owners may be facilitated due to the ensured efficient management of the EV battery lifespan, thus allowing for electric vehicle owners to monetize their EV batteries. Managing the states-of-charge of the EV batteries in accordance with the present invention may also allow second-life EV battery providers to warranty the second-life EV batteries, as the states-of-health of entire groups of EV batteries may now be ensured. Moreover, the inefficiencies and waste of providing second-life EV batteries can be avoided, due to the similarities in states-of-health of entire groups of second-life EV batteries.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed

FIG. 6 illustrates a still further exemplary method in accordance with one or more aspects of the present invention.

DETAILED DESCRIPTION OF THE PREFERRED EMBODIMENTS

Figure 1:
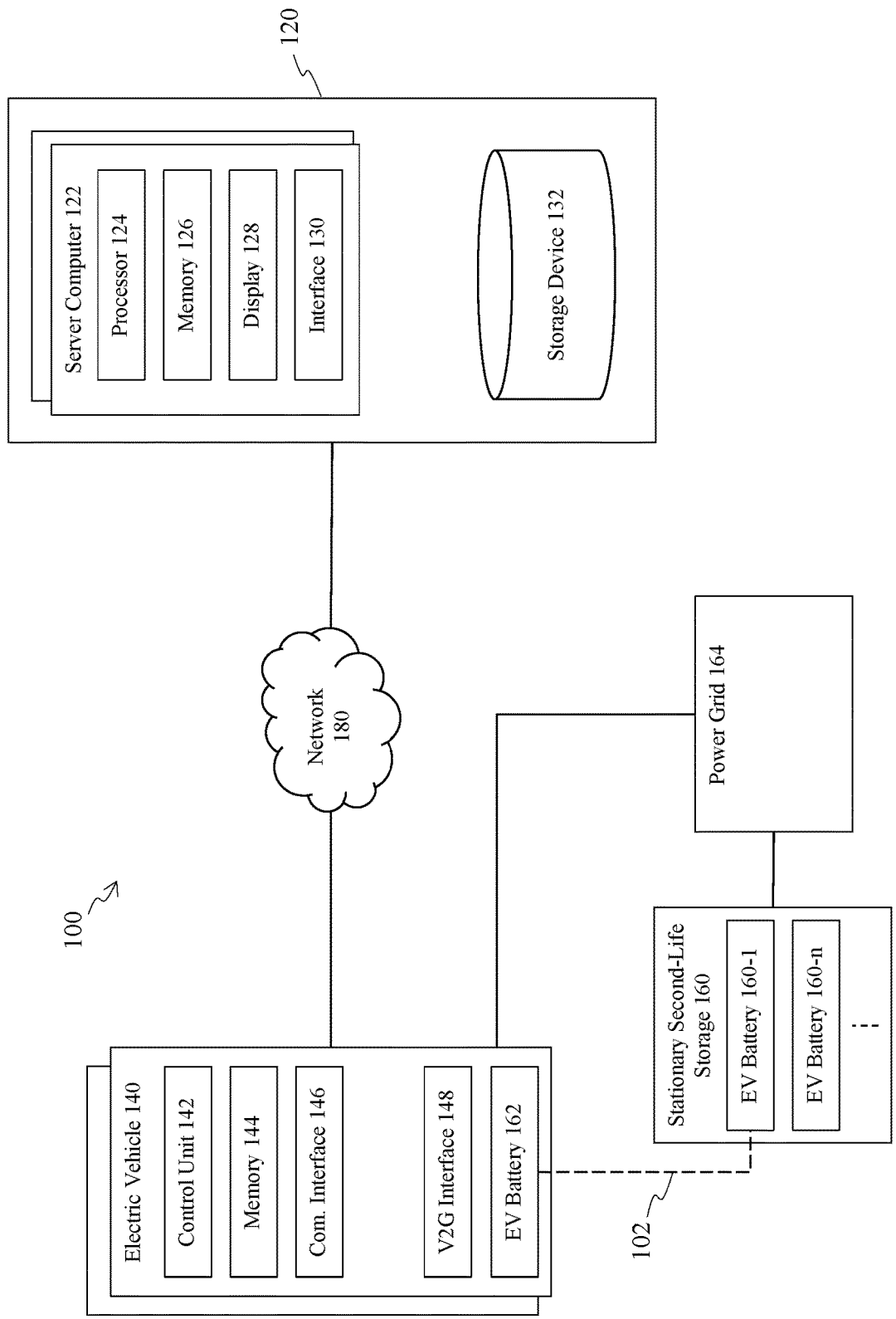
FIG. 1 illustrates a vehicle battery second-life system in accordance with one or more aspects of the present invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

FIG. 1 illustrates a vehicle battery second-life system 100 in accordance with at least one embodiment of the present invention. The vehicle battery second-life system 100 may include a state-of-health management server 120 communicatively coupled via a network 180 to a plurality of electric vehicles 140, each having an EV battery 162 with a state-of-health to be managed by the server 120 for second-life uses.

The plurality of electric vehicles 140 may be of any vehicle type in which electricity from the EV battery 162 is controlled to power locomotion. This may include battery electric vehicles (BEV), hybrid petroleum electric vehicles, plug-in-hybrid electric vehicles (PHEV), hybrid nuclear electric vehicles, hybrid hydrogen electric vehicles, and hybrid solar electric vehicles. One or more of the plurality of electric vehicles 140 may be vehicle-to-grid electric vehicles 140 configured to electrically connect to the local power grid for charging and discharging the EV battery 162. The EV battery 162 may be, for example, a rechargeable lithium-ion battery.

The plurality of electric vehicles 140 may each include a control unit 142. The vehicle control unit 142 may instruct components of the vehicle to perform various tasks, including locomotive, charging and discharging related tasks, based on the processing of information, commands and/or data that may have been previously stored or may have been received, via a communications interface 146, such as instructions, commands and/or data stored in a memory 144.

The control unit 142 may be a standard processor, such as a central processing unit (CPU), or may be a dedicated processor, such as an application-specific integrated circuit (ASIC) or a field programmable gate array (FPGA). The memory 144 may be hardware capable of storing information accessible by the control unit 142, such as a ROM, RAM, hard-drive, CD-ROM, DVD, write-capable, read-only, etc. The memory 144 may further store a set of instructions included in software that can be implemented by the control unit 142 to perform the various tasks, either individually or in connection with other components of the vehicle, in accordance with the principles discussed herein.

The memory 144 may further store data related to the electric vehicle 140, which may be gathered by one or more sensors (not shown) associated with the electric vehicle 140. The electric vehicle related data may include, for example: current and historical state-of-health information, geographic location and route data, charging and/or discharging operations data, EV battery lifespan data, etc. The electric vehicle related data may be gathered by the one or more sensors periodically, or in response to some triggering event, such as, for example, at the onset of charging and/or discharging operations.

Determinations may be made as to how to operate the electric vehicle 140 based on the electric vehicle related data. In particular, the vehicle control unit 142 may instruct components of the electric vehicle 140 in how to utilize the EV battery 162, e.g., in locomotion, charging and/or discharging operations, based on such determinations.

The state-of-health information is information that may be utilized to determine the state-of-health of the EV battery 162. The state-of-health information may include, for example, internal resistance, impedance, conductance, capacity, voltage, self-discharge, charge acceptance, number of charge-discharge cycles, etc. The states-of-health information may be determined using known devices and methodologies that are not the subject of the invention.

Figure 3:
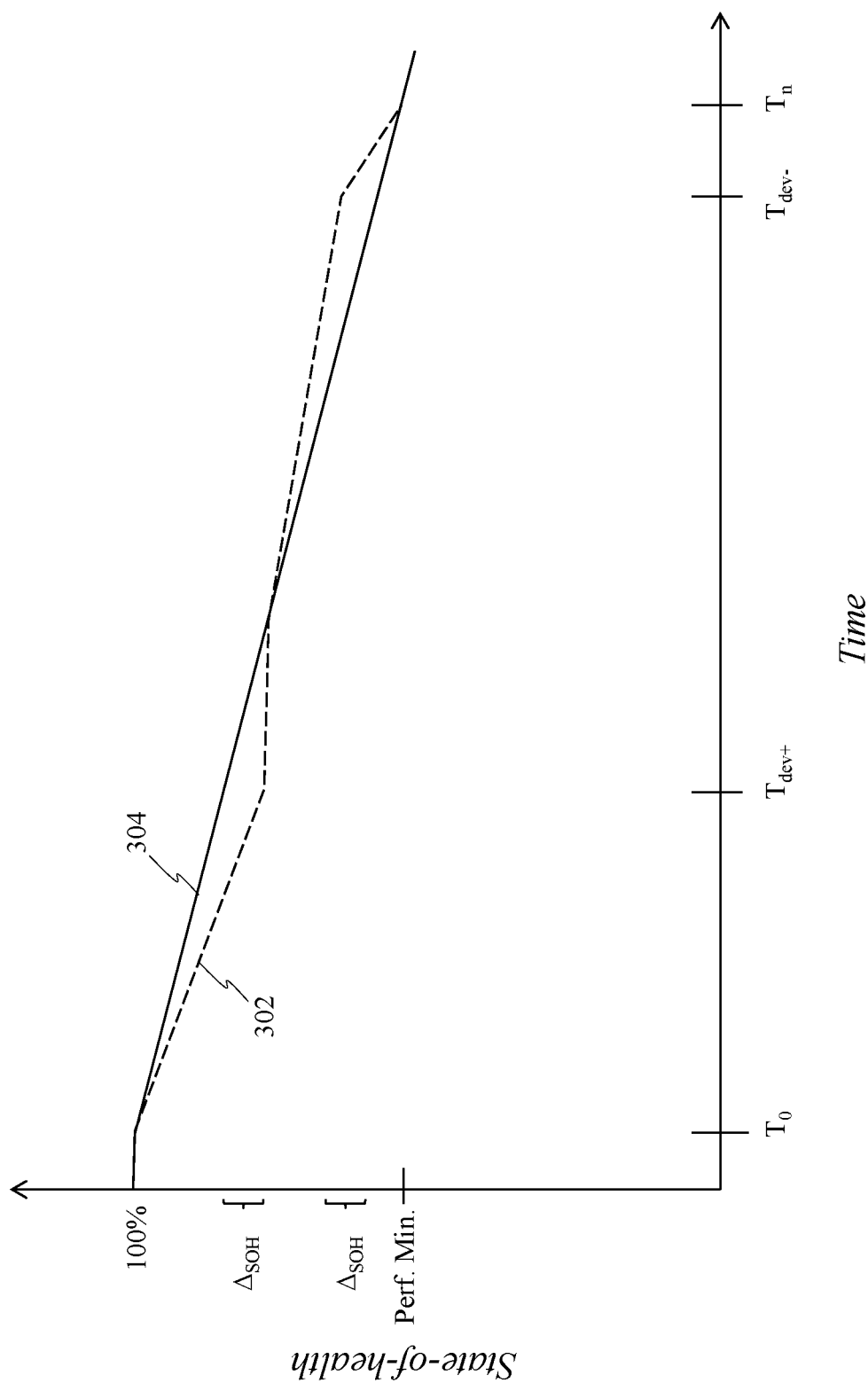
FIG. 3 illustrates exemplary states-of-health curves in accordance with one or more aspects of the present invention.

The battery lifespan data reflects an expected lifespan $T_{0 \rightarrow n}$ of the EV battery 162 and may indicate where the EV battery 162 is in its expected lifespan within the electric vehicle 140, with respect to a starting point $T_0$ and an ending point $T_n$ of the expected lifespan within the electric vehicle 140. FIG. 3 illustrates an exemplary state-of-health curve 302 of an exemplary EV battery 162. The ending point may reflect a point in time at which it is anticipated that the EV battery 162 will be permanently removed from the vehicle, e.g., when the EV battery 162 no longer meets minimum performance requirements. The ending point may also reflect the beginning of the EV battery second-life. The starting point may reflect a point in time at which the state-of-health of the EV battery 162 is substantially 100%, which may be, for example, when the EV battery 162 is first put into operation within the electric vehicle 140. The expected lifespan may therefore be a period of time between the starting point and the ending point. The battery lifespan data may be determined using known devices and methodologies that are not the subject of the invention.

The geographic location and route data reflect the movement of the electric vehicle 140 in operation. The geographic location and route data may be, for example, data indicating the historical and anticipated travel usage of the electric vehicle 140. The geographic and route data may be determined using known devices and methodologies that are not the subject of the invention.

The charging and/or discharging operations data may reflect aspects of historical and anticipated charging and/or discharging operations. The charging and/or discharging operations data may, for example, include the frequency, amount, and location of charging and/or discharging operations, as well as the state-of-charge of the battery before and after the charging and/or discharging operations, and any anticipated charging and/or discharging operations. The charging and/or discharging operations data may be determined using known devices and methodologies that are not the subject of the invention.

Each electric vehicle 140 may further include a vehicle-to-grid (V2G) interface 148 via which the EV battery 162 is bi-directionally coupled to a power grid 164 for the bi-directional exchange of electric power therebetween. The bi-directional electrical coupling of the EV batteries to the power grid may be accomplished using known methodologies that are not the subject of the invention.

The state-of-health management server 120 may include a plurality of computers and/or computing devices, including one or more server computers 122 and storage devices 132. The computers may include appropriately configured hardware, such as, for example, one or more processors 124, memories 126, displays 128 and interfaces 130, as well as appropriate software for instructing the server 120 to operate in accordance with the principles described herein. It will be understood that the state-of-health management server 120 may also be a decentralized state-of-health management server system comprised of a plurality of networked state-of-health management servers 120.

The processors may be standard processors, such as a central processing unit (CPU), or may be dedicated processors, such as an application-specific integrated circuit (ASIC) or a field programmable gate array (FPGA). The memories may be hardware capable of storing information accessible by the processor, such as a ROM, RAM, hard-drive, CD-ROM, DVD, write-capable, read-only, etc. The memories may further store a set of instructions included in software that can be implemented by the processors to perform the various tasks, either individually or in connection with other components of the server 120, in accordance with the principles discussed herein.

The displays may be any type of device capable of communicating data to a user, such as a liquid-crystal display ("LCD") screen, a plasma screen, etc. The interfaces may allow communication with the computers, and each may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The storage devices may be configured to store large quantities of data and/or information. For example, the storage devices may be a collection of storage components, or a mixed collection of storage components, such as ROM, RAM, hard-drives, solid-state drives, removable drives, network storage, virtual memory, cache, registers, etc. The storage devices may also be configured so that the computers may access it via the network.

The network may be any type of network, wired or wireless, configured to facilitate the communication and transmission of data, instructions, etc. from one component to another component of the network. For example, the network may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

Although not shown, the state-of-health management server 120 may also include one or more sensors configured to sense environmental and enterprise resource contextual information relevant to the operations and functionalities described herein.

It is to be understood that the network configuration illustrated in FIG. 1 serves only as an example and is thus not limited thereto. The vehicle battery second-life system, for instance, may include numerous other components connected to network, and may include more than one of each network component (as shown by the cascaded blocks), and the network may be connected to other networks.

Figure 2:
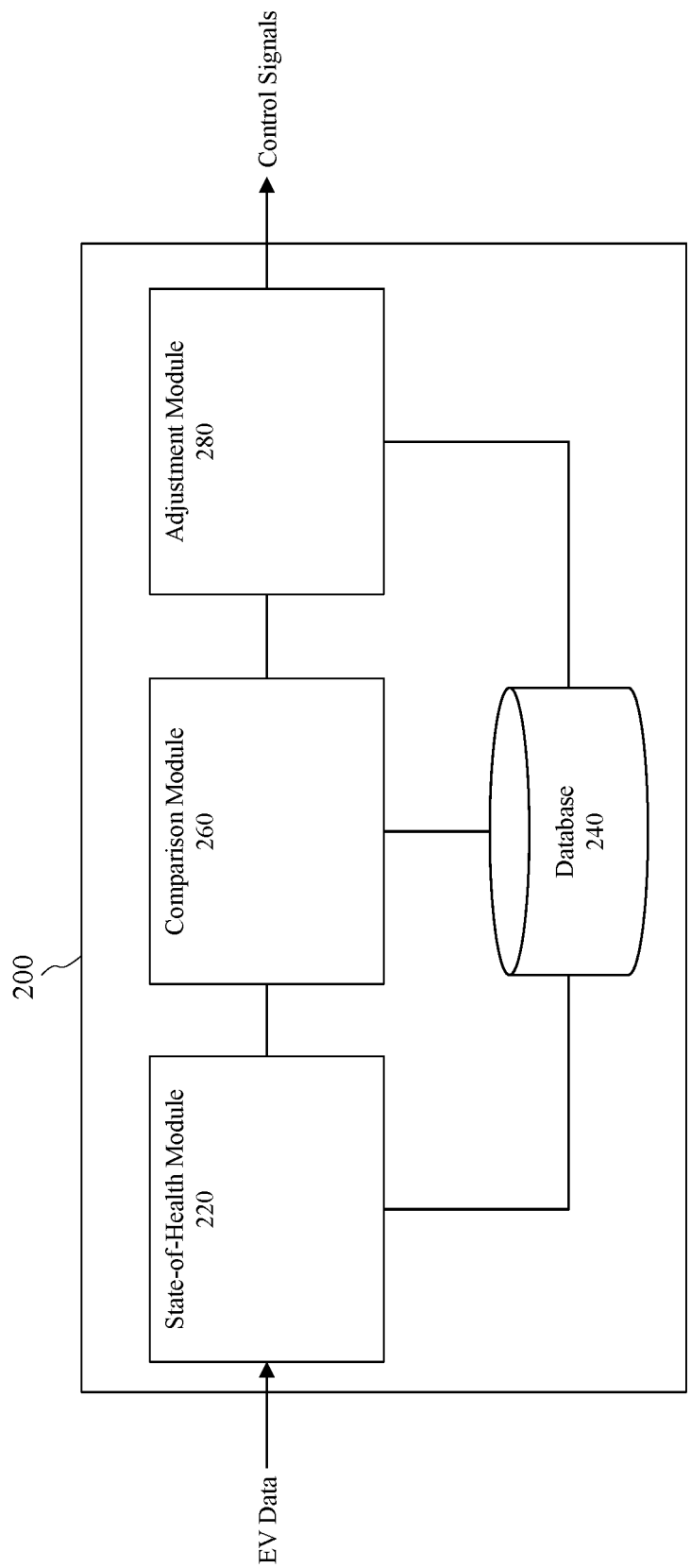
FIG. 2 illustrates an exemplary architecture for the managing the state-of-health of the EV batteries for a second-life in accordance with one or more aspects of the present invention.

FIG. 2 illustrates an exemplary architecture 200 for the managing the state-of-health of the EV batteries for a second-life, which architecture is preferably embodied at least partially in the state-of-health management server, although one or more components and/or functionalities may be embodied in one or more of the electric vehicles 140. The architecture may include several functional modules, including: a state-of-heath module 220, a database 240, a comparison module 260, and an adjustment module 280.

The state-of-health module 220 may be configured to receive the electric vehicle related data from each of the plurality of electric vehicles 140. The state-of-health module 220 may further be configured to retrievably store the received electric vehicle related data in the database. The state-of-health module 220 may be configured to determine the respective states-of-health of each of the EV batteries of the electric vehicles 140, based on the received electric vehicle related data.

The state-of-health module 220 may additionally or alternatively be configured to receive the respective states-of-health from the plurality of electric vehicles 140. Accordingly, one or more of the electric vehicles 140, namely the vehicle control units 142, may be configured to determine their respective EV batteries' states-of-health, based on the electric vehicle related data, and to transmit their respective states-of-health to the state-of-health management server 120, to be received by the state-of-health module 220. The state-of-health module 220 may further be configured to retrievably store the received states-of-health in the database, in association with their respective electric vehicles 140.

The states-of-health of each EV battery 162 may be determined using known methodologies that are not the subject of the invention.

The database 240 may also retrievably store a reference state-of-health curve 304, which may correlate the state-of-health of a reference EV battery 162 over its lifespan. The reference EV battery 162 may be a theoretical EV battery, or an actual EV battery selected from among the EV batteries of the plurality of electric vehicles 140. FIG. 3 illustrates an example reference state-of-health curve. It will be understood, however, that a reference table or other method of correlating the state-of-health of the reference EV battery over its lifespan may be used without departing from the principles of the invention. The database 240 may include local and/or non-local tenant databases.

The comparison module 260 may be configured to retrieve the reference state-of-health curve 304 and the states-of-health 302 of the respective EV batteries. The comparison module 260 may further be configured to compare the states-of-health 302 of each respective EV battery 162 with the reference state-of-health curve 304. The comparison module 260 may further be configured to determine, for each EV battery 162, whether the state-of-health of the EV battery 162 deviates from the reference state-of-health. This determination may be made for a point in the lifetime of the reference EV battery that corresponds to the present point in the lifetime of the EV battery 162. The comparison module 260 may further be configured to determine a deviance value $\Delta_{SOH}$ by which the state-of-health 302 of the EV battery 162 deviates from the reference state-of-health 304. The respective deviance values may be retrievably stored in the database, in association with their corresponding electric vehicles 140.

The adjustment module 280 may be configured to retrieve the deviance value. The adjustment module 280 may further be configured to generate, based on the deviance value, control signals for controlling the operation of respective electric vehicles 140 to reduce their respective deviance values. In particular, the control signals may adjust (or plan and/or initiate a future adjustment of) the vehicle-to-grid operations of the vehicles so as to reduce their respective deviance values. For example, at a time $T_{dev+}$ where the state-of-health should be preserved in order to reduce the deviance value, the control signals adjust the vehicle-to-grid operations to so preserve the state-of-health. On the other hand, at a time $T_{dev-}$ where the state-of-health should be lowered in order to reduce the deviance value, the control signals adjust the vehicle-to-grid operations to so lower the state-of-health In operation, the control signals may control respective electric vehicles 140 to adjust charging and/or discharging rates and profiles so as to minimize their respective deviance value. In general, when the deviance value is above the reference state-of-health, the control signals may increase the rates and/or amounts of discharging, whereas, when the deviance value is below the reference state-of-health, the control signals may decrease the rates and/or amounts of discharging. Such adjustments may also take into account anticipated states and needs of the electric vehicle 140, such as, for example, anticipated further charging and/or discharging, anticipated travel use of the electric vehicle 140, etc.

In other words, for each EV battery 162, the state-of-health management server 120 provides a control feedback loop for maintaining the state-of-health of the EV battery 162 at or near the reference state-of-health over the lifespan of the EV battery 162. In this manner, the states-of-health of the plurality of EV batteries, at least by their ending points, may be managed to be substantially the same.

In some embodiments, the plurality of electric vehicles 140 may be provided with the reference state-of-health retrievably stored in the vehicle memory 146. The reference state-of-health may, for example, be provided via the state-of-health management server 120. Accordingly, the vehicle control units 142 may be configured to, on an individual electric vehicle basis, determine the deviance value, and to generate, based on the deviance value, vehicle control signals for controlling the operation of the electric vehicle 140 to reduce its deviance value, in a similar manner as the state-of-health management server 120. As such, one or more of the functions of the state-of-health management server 120 may be subsumed by the vehicle control unit 142.

Returning back to FIG. 1, the vehicle battery second-life system may further include a power consumer 164 electrically coupled to a stationary second-life unit 160, which includes a plurality of second-life EV batteries 162-1 through 162-n, such that the plurality of second-life EV batteries 162 together provide electricity to the power consumer.

The second-life EV batteries correspond to the plurality of EV batteries whose states-of-charge have been managed, in accordance with the principles discussed herein, such that each has substantially the same respective state-of-health. That the EV batteries are in their second-life is reflected in FIG. 1 by dotted line 102.

The power consumer may be the power grid 164, which may distribute electrical energy amongst other power consumers, e.g., electrically powered devices, that are electrically connected thereto. The grid may therefore utilize the plurality of second-life EV batteries as a rechargeable electrical storage unit 160, from which to draw electricity in accordance with known methodologies that are not the subject of the invention.

Figure 4:
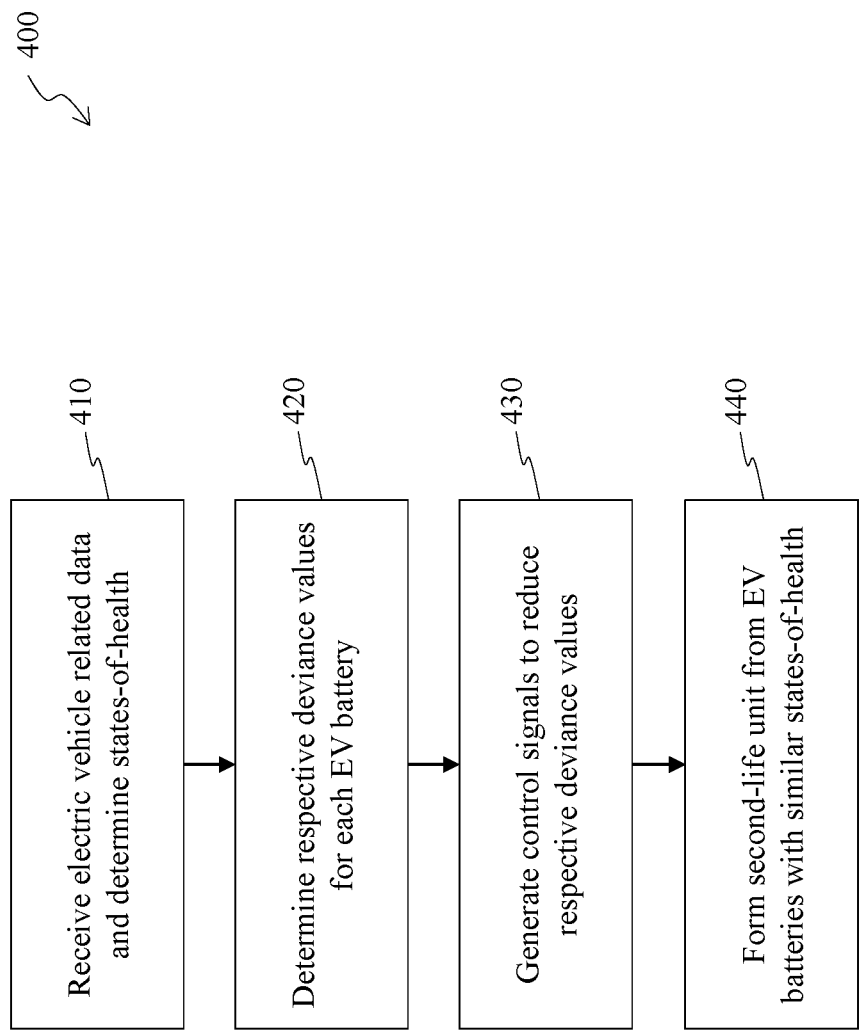
FIG. 4 illustrates an exemplary method in accordance with one or more aspects of the present invention.

An exemplary method 400 for facilitating vehicle battery second-lives in accordance with at least one embodiment of the present invention is shown in FIG. 4.

At step 410, the state-of-health module 220 may receive the electric vehicle related data from each of the plurality of electric vehicles 140, and determine the respective states-of-health of each of the EV batteries of the electric vehicles 140, based on the received electric vehicle related data. This may occur, for example, in response to the electric vehicle 140 sensing that it is connected to the grid for charging/discharging, and/or in response to other triggers and/or periodically. The state-of-health module 220 may retrievably store the received electric vehicle related data and/or the respective states-of-health in the database, in connection with corresponding electric vehicles 140.

At step 420, the comparison module 260 may retrieve the reference state-of-health curve and the states-of-health of the respective EV batteries, and may determine the respective deviance value from the reference state-of-health curve for each EV battery 162.

The deviance values may be retrievably stored in the database, in connection with corresponding electric vehicles 140.

At step 430, the adjustment module 280 may retrieve the deviance values and generate, based on the deviance values, control signals for controlling the operation of respective electric vehicles 140 to reduce their respective deviance values. The various control signals and operations may be as discussed herein.

At step 440, the EV batteries of the plurality of electric vehicles 140 are removed from the electric vehicles 140 to together form the stationary second-life unit 160, in which each of the EV batteries have substantially similar states-of-health. The stationary second-life unit 160 may thereafter provide electricity to the grid.

Figure 5:
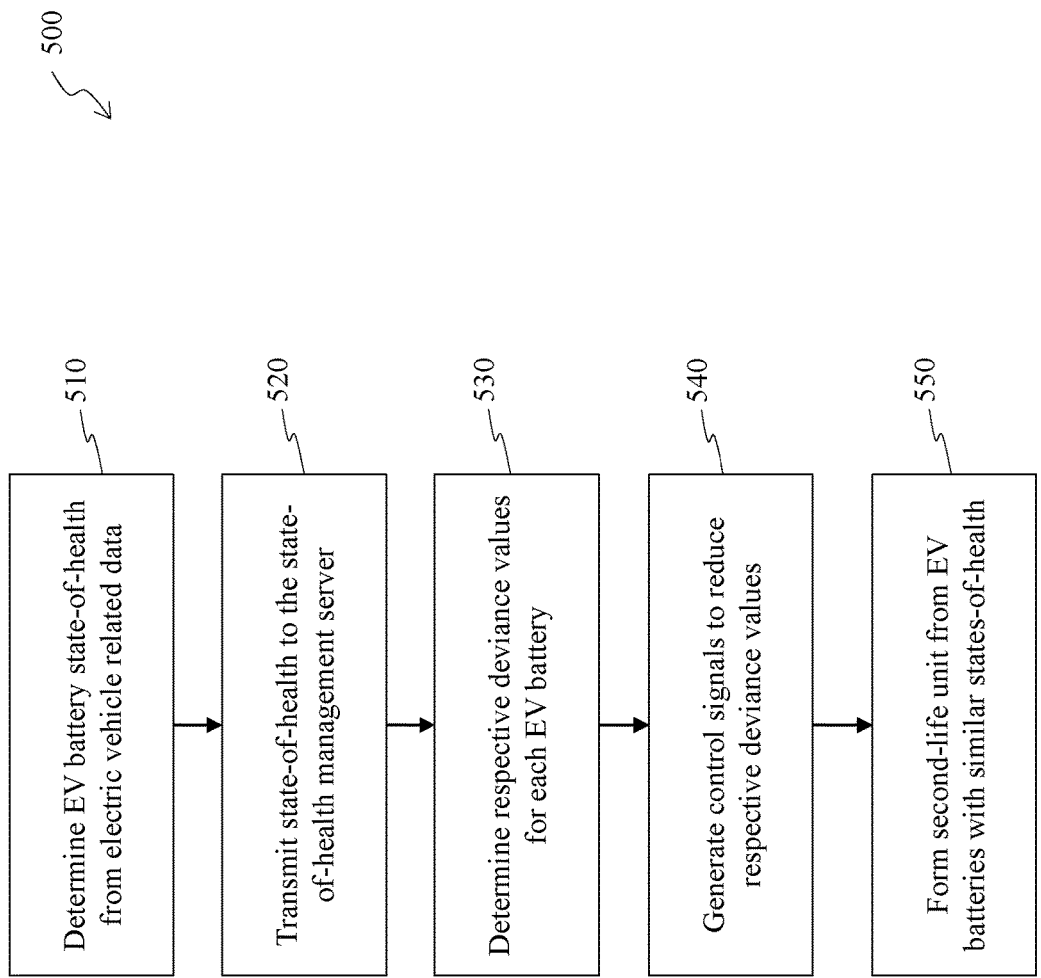
FIG. 5 illustrates a further exemplary method in accordance with one or more aspects of the present invention.

A further exemplary method 500 for facilitating vehicle battery second-lives in accordance with at least one embodiment of the present invention is shown in FIG. 5.

At step 510, each vehicle control unit 142 may generate the electric vehicle related data from data generated by the sensors, and may determine its electric vehicle's EV battery's respective state-of-health, based on the electric vehicle related data.

At step 520, the respective states-of-health may be transmitted to the state-of-health management server 120, where the state-of-health module 220 may receive the respective states-of-health and retrievably store the received states-of-health in the database, in association with their respective electric vehicles 140.

At step 530, the comparison module 260 may retrieve the reference state-of-health curve and the states-of-health of the respective EV batteries, and may determine the respective deviance value from the reference state-of-health curve for each EV battery 162. The deviance values may be retrievably stored in the database, in connection with corresponding electric vehicles 140.

At step 540, the adjustment module 280 may retrieve the deviance values and generate, based on the deviance values, control signals for controlling the operation of respective electric vehicles 140 to reduce their respective deviance values. The various control signals and operations may be as discussed herein.

At step 550, the EV batteries of the plurality of electric vehicles 140 are removed from the electric vehicles 140 to together form the stationary second-life unit 160, in which each of the EV batteries have substantially similar states-of-health. The stationary second-life unit 160 may thereafter provide electricity to the grid.

A still further exemplary method 600 for facilitating vehicle battery second-lives in accordance with at least one embodiment of the present invention is shown in FIG. 6.

At step 610, the reference state-of-health curve may be stored in the memory 146 of each of the plurality of electric vehicles 140. The reference state-of-health curve may be provided by, for example, the state-of-health management server 120 during the manufacture of the electric vehicle 140.

At step 620, each vehicle control unit 142 may generate the electric vehicle related data from data generated by the sensors, and may determine the current state-of-health of the EV battery 162 of its corresponding electric vehicle 140, based on the electric vehicle related data. The vehicle control unit 142 may retrievably store the current state-of-health in the memory 146 of its electric vehicle 140.

At step 630, each vehicle control unit 142 may compare the reference state-of-health curve and the current state-of-health to determine the deviance value from the reference state-of-health curve for the EV battery 162 of its corresponding electric vehicle 140. The deviance value may be retrievably stored in the memory 146 of the corresponding electric vehicle 140.

At step 640, each vehicle control unit 142 may generate, based on the deviance value, control signals for controlling the operation of the electric vehicle 140 to reduce its deviance value. The various control signals and operations may be as discussed herein.

At step 650, the EV batteries of the plurality of electric vehicles 140 are removed from the electric vehicles 140 to together form the stationary second-life unit 160, in which each of the EV batteries have substantially similar states-of-health. The stationary second-life unit 160 may thereafter provide electricity to the grid.

In accordance with at least these disclosed principles, the state-of-health of each EV battery within the plurality of electric vehicles is provided with a control feedback loop for maintaining the state-of-health of the EV battery at or near the reference state-of-health over the lifespan of the EV battery. In this manner, the states-of-health of the plurality of EV batteries, at least by their ending points, may be managed to be substantially the same.

Accordingly, several advantages of the present invention may be realized. For example, participation in vehicle-to-grid and second-life programs by electric vehicle owners may be facilitated due to the ensured efficient management of the EV battery lifespan, thus allowing for electric vehicle owners to monetize their EV batteries. Managing the states-of-charge of the EV batteries in accordance with the present invention may also allow second-life EV battery providers to warranty the second-life EV batteries, as the states-of-health of entire groups of EV batteries may now be ensured. Moreover, the inefficiencies and waste of providing second-life EV batteries can be avoided, due to the similarities in states-of-health of entire groups of second-life EV batteries.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein generally include hardware and/or software/firmware, including but not limited to: processors, memories, input/output interfaces, operating systems and network interfaces, configured to effectuate the functionalities described herein. When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments.

Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A system for managing second-lives of a plurality of electric vehicle (EV) batteries, the system comprising:
a plurality of electric vehicles, each electric vehicle including at least one of the plurality of EV batteries during a first-life of each respective EV battery, in which each respective EV battery is utilized to power a respective one of the plurality of electric vehicles, wherein each of the plurality of electric vehicles is configured for bi-directional electric power exchange with a power grid via a vehicle-to-grid interface;
a stationary second-life unit, which includes each of the plurality of EV batteries during a second-life of each respective EV battery, wherein the stationary second-life unit is configured for bi-directional power exchange with the power grid;
wherein a state-of-health of each of the plurality of EV batteries is individually controlled, during the first-life of each respective EV battery, such that the plurality of EV batteries each have substantially similar states-of-health at a start of the second-life of each respective EV battery.

2. The system of claim 1, wherein controlling the state-of-health of each of the plurality of EV batteries includes controlling a vehicle-to-grid discharging operation of each electric vehicle.

3. The system of claim 2, wherein controlling the vehicle-to-grid discharging operation of each electric vehicle includes controlling at least one of: a discharge rate and a discharge amount.

4. The system of claim 1, further comprising:
a server system communicatively coupled to each electric vehicle, the server system configured to generate control signals for controlling the state-of-health of each respective EV battery during the first-life of each respective EV battery.

5. The system of claim 4, wherein controlling the state-of-health of each of the plurality of EV batteries includes controlling a vehicle-to-grid discharging operation of each electric vehicle.

6. The system of claim 4, wherein controlling the vehicle-to-grid discharging operation of each electric vehicle includes controlling at least one of: a discharge rate and a discharge amount.

7. The system of claim 1, wherein each electric vehicle further includes:
a vehicle control unit configured to generate control signals for controlling the state-of-health of a respective EV battery during the first-life of the respective EV battery.

8. The system of claim 7, wherein controlling the state-of-health of the respective EV battery includes controlling a vehicle-to-grid discharging operation of the respective electric vehicle.

9. The system of claim 8, wherein controlling the vehicle-to-grid discharging operation of the respective electric vehicle includes controlling at least one of: a discharge rate and a discharge amount.

10. The system of claim 1, further comprising:
a server system communicatively coupled to each electric vehicle, the server system configured to generate control signals for controlling the state-of-health of each respective EV battery during the first-life of each respective EV battery, and
wherein at least one of the electric vehicles further includes:
a vehicle control unit configured to generate control signals for controlling the state-of-health of a respective EV battery during the first-life of the respective EV battery.

11. The system of claim 10, wherein controlling the state-of-health of the respective EV battery includes controlling a vehicle-to-grid discharging operation of the respective electric vehicle.

12. The system of claim 11, wherein controlling the vehicle-to-grid discharging operation of the respective electric vehicle includes controlling at least one of: a discharge rate and a discharge amount.

13. A method for managing a plurality of electric vehicle (EV) batteries, wherein each of the plurality of EV batteries is utilized to power a respective vehicle-to-grid (V2G) electric vehicle of a plurality of V2G electric vehicles during a first-life of each respective EV battery, the method comprising:
determining a respective state-of-health of each of the plurality of EV batteries, during the first-life of each respective EV battery;
determining a respective deviance value for the respective state-of-health of each of the plurality of EV batteries, during the first-life of each respective EV battery, the respective deviance value reflecting an amount by which the respective state-of-health deviates from a reference state-of-health;
controlling vehicle-to-grid operations of each of the plurality of V2G electric vehicles so as to reduce the respective deviance value of each respective EV battery such that the plurality of EV batteries each have respective state-of-health that are substantially the same; and
removing each of the plurality of EV batteries from respective V2G electric vehicles so as to form therewith a stationary second-life unit, wherein the stationary second-life unit includes each of the plurality of EV batteries, and wherein the stationary second-life unit is configured for bi-directional power exchange with a power grid.

14. The method of claim 13, wherein controlling the vehicle-to-grid operations of each of the plurality of V2G electric vehicles includes controlling a vehicle-to-grid discharging operation of each respective electric vehicle.

15. The method of claim 14, wherein controlling the vehicle-to-grid discharging operation of each respective electric vehicle includes controlling at least one of: a discharge rate and a discharge amount.

* * * * *